United States Patent [19]

Bath

[11] Patent Number: 5,112,894
[45] Date of Patent: May 12, 1992

[54] COMPOSITION OF CARBOXYLIC ACID AND SULPHUR-CONTAINING ACIDS OR SALTS SUITABLE FOR INCORPORATION INTO OLEFIN POLYMERS

[75] Inventor: Colin Bath, Bury, England

[73] Assignee: Imperial Chemical Industries PLC, London, England

[21] Appl. No.: 598,430

[22] Filed: Oct. 16, 1990

Related U.S. Application Data

[60] Division of Ser. No. 328,009, Mar. 23, 1989, Pat. No. 5,013,778, which is a continuation-in-part of Ser. No. 249,876, Sep. 26, 1988, abandoned.

[30] Foreign Application Priority Data

Mar. 29, 1988 [GB] United Kingdom ............... 8807393
Aug. 4, 1988 [GB] United Kingdom ............... 8818562

[51] Int. Cl.$^5$ ............................................. C08K 5/41
[52] U.S. Cl. ................................... 524/173; 524/300; 524/230; 524/583; 524/585
[58] Field of Search ........................................ 524/173

[56] References Cited

FOREIGN PATENT DOCUMENTS 45-17545  6/1970  Japan .

Primary Examiner—Melvyn I. Marquis
Assistant Examiner—Mark Sweet
Attorney, Agent, or Firm—Cushman, Darby & Cushman

[57] ABSTRACT

A composition comprises a carboxylic acid compound which contains at least three carbon atoms together with an organic sulphur-containing acid or salt of such an acid. The carboxylic acid may be an aliphatic diacid such as succinic acid. The sulphur-containing acid may be a sulphonic acid or sulphuric acid derivative such as the sodium salt of an alkyl sulphonic acid or of sulpho-succinic acid or of a carboxylic acid ester derivative of sulpho-succinic acid. The composition may be incorporated into an olefin polymer. The composition may be obtained by conventional powder blending or, for a polymer composition, melt blending techniques. Preferred polymer compositions have an increased clarity and a reduced level of haze compared to the polymer alone or the polymer containing only the carboxylic acid.

19 Claims, No Drawings

COMPOSITION OF CARBOXYLIC ACID AND SULPHUR-CONTAINING ACIDS OR SALTS SUITABLE FOR INCORPORATION INTO OLEFIN POLYMERS

The present invention relates to compositions and also to the use of such compositions as additives for incorporation into polymer materials, and to the production of polymer compositions and shaped articles formed from such compositions.

Olefin polymers are readily available and widely used polymeric materials. The most extensively available olefin polymers are ethylene and propylene polymers, the term "polymer" being used herein to include co-polymers. Propylene polymers have a melting point which is generally higher than that of ethylene polymers and hence propylene polymers are suitable for use at somewhat higher temperatures than ethylene polymers. Ethylene and propylene polymers can be used for packaging but moulded articles formed from these polymers generally show a high percentage of haze and hence are not satisfactory for applications in which good clarity is desirable.

It is known that the addition of nucleating agents, for example sodium benzoate, to olefin polymers provides an increase in the crystallisation temperature, and/or an improvement in the optical properties, of the polymer. Furthermore, the use of nucleating agents can allow a shorter cycle time, and hence better productivity, in an injection moulding process. However, the use of such nucleating agents is often limited due to their high price, for example dibenzylidene sorbitol, or to dispersion problems, for example with sodium benzoate.

In our copending European Patent Application Publication No. 0267695, we disclose a composition comprising a mixture of (a) a carboxylic acid compound which contains at least three carbon atoms; and (b) an amine. Such mixtures are disclosed as being effective to increase the crystallisation temperature and/or to improve the optical properties, of olefin polymers. We have now found further compositions which include a carboxylic acid compound and which are effective in improving the properties of olefin polymers and are capable of giving olefin polymers having superior optical properties to the olefin polymer compositions described in our copending European Patent Application Publication No. 0267695.

According to the present invention there is provided a composition comprising (a) a carboxylic acid compound which contains at least three carbon atoms; and (b) an organic sulphur-containing acid or a salt of said acid.

The carboxylic acid compound which is component (a) is preferably one containing at least two carboxylic acid groups attached to an optionally substituted saturated aliphatic hydrocarbon group or one containing at least one carboxylic acid group attached to an optionally substituted saturated or unsaturated ring system. Carboxylic acids containing at least two carboxylic acid groups attached to an aliphatic hydrocarbon group include glutaric acid, adipic acid, succinic acid, suberic acid, pimelic acid, azelaic acid and sebacic acid. Preferred carboxylic acids of this type contain two carboxylic acid groups and from three to ten carbon atoms. Carboxylic acids containing at least one carboxylic acid group attached to a ring system include monocarboxylic acids such as benzoic acid, toluic acid, and p-tertiary butyl benzoic acid, hydroxycarboxylic acids such as salicyclic acid, and dicarboxylic acids such as phthalic acid, terephthalic acid, cyclohexane-1,2-dicarboxylic acid and cyclohexane-1,4-dicarboxylic acid. If the acid includes a substituted aliphatic hydrocarbon group or ring system, the substituent may be at least one hydroxy group, halogen atom, ester (that is an acyloxy) group, a sulphur-containing acid group or a salt of said acid, nitrile group, ether group or a different hydrocarbon group, that is a hydrocarbon ring or an aliphatic group respectively, and the hydrocarbon groups of the substituent may be further substituted with the same or different substituent groups. The substituent may contain several halogen atoms, for example as in a trifluoro- or trichloro-methyl group. With the exception of a hydroxy group substituent, and the carboxylic acid groups which are present, it is generally preferred that the hydrocarbon group of the carboxylic acid contains no other substituents. The carboxylic acid which is used as component (a) is a nucleating and/or clarifying agent for olefin polymers and when incorporated into an olefin polymer is effective to increase the crystallisation temperature and/or to improve the optical properties of the polymer.

The organic sulphur-containing acid or salt thereof, is one containing a sulphur acid group, particularly a sulphonic or sulphuric acid group. Thus, component (b) may be a compound of the general formula I:

$$RSO_nM \qquad \qquad I$$

where
R is a hydrocarbon group which may be substituted;
M is a hydrogen atom or a cation; and
n is 2, 3 or 4.

The group R may be an alkyl, cycloalkyl, or aryl group. If the group R is a substituted hydrocarbon group, the substituent may be at least one halogen atom, a carboxylic acid group (—COOH), an ester (that is an acyloxy) group, sulphur-containing acid group, a nitrile group, an ether group or a different hydrocarbon group, and the hydrocarbon groups of the substituent may be further substituted with the same or different substituent groups. The substituent may contain several substituent atoms or groups, for example several halogen atoms as in a trifluoro- or trichloro-methyl group, or there may be more than one substituent group, for example two ester groups. It is generally preferred that the group R contains at least 6 carbon atoms, particularly at least 6 carbon atoms in a hydrocarbon chain. Thus, if the group R contains substituent groups such as acyloxy or nitrile, it preferably contains at least 6 carbon atoms in addition to those present in the carbonyl or nitrile group. Preferred compounds are those in which the group R contains at least 8, and especially at least 12, carbon atoms in a hydrocarbon chain. The group R is preferably an alkyl group such as an octyl, nonyl, decyl, dodecyl, tridecyl, tetradecyl, pentadecyl, hexadecyl, heptadecyl or octadecyl group and may be a mixture of different isomers or of groups containing different numbers of carbon atoms, or both. If the group R is a substituted hydrocarbyl group it may be, for example, a derivative of succinic acid, when component (b) may be a dicarboxylic ester of sulpho-succinic acid. If the group R contains a sulphur-containing acid group, the compound will be a di- or poly-sulphur-containing acid compound, such as, for example benzene disulphonic acid and salts thereof.

The value of n is typically three or four. We have obtained useful results using compounds in which the value of n is three.

M may be a hydrogen atom or a cation which may be an ammonium ion, including a quaternary ammonium ion, or a metal. The metal may have a valency of more than one in which case M represents sufficient of the metal to satisfy the valency of the group $RSO_n$. Thus, if the compound contains a divalent metal such as, for example, calcium, magnesium or zinc, or contains aluminium then M represents half or a third of an atom of the metal. The metal M is conveniently a monovalent metal, especially an alkali metal.

As a preferred aspect of the present invention, the organic sulphur-containing acid or salt thereof is a compound of the general formula II:

$$R^1SO_3M^1 \qquad \qquad II$$

where
$R^1$ is a hydrocarbon group containing at least 6 carbon atoms or a hydrocarbon group substituted with at least on $COOR^2$ group;
$R^2$ or each $R^2$ is hydrogen or a hydrocarbon group which may be the same or different, and $R^1$ and $R^2$ between them contain at least 6 carbon atoms; and
$M^1$ is an alkali metal.

Unlike the carboxylic acid which is component (a) of the composition, the organic sulphur-containing acid or salt which is component (b) has little effect as a nucleating and/or clarifying agent when incorporated into an olefin polymer but, in admixture with component (a), the sulphur-containing acid or salt results in a noticeable improvement in the effect of component (a).

If $R^1$ is substituted with at least one $COOR^2$ group, it is preferred that $R^2$, or all the groups $R^2$ if there is more than one $COOR^2$ substituent, between them contain at least 6 carbon atoms. The group $R^1$ may be substituted with two groups $COOR^2$, as in the dicarboxylic esters of sulpho-succinic acid.

The alkali metal $M^1$ is preferably potassium or especially sodium.

We have obtained a useful result when component (a) is succinic acid and component (b) is a sodium alkyl sulphonate in which the alkyl group contains from 12 to 18 carbon atoms or is a mixture of alkyl groups containing from 12 to 18 carbon atoms, predominantly 14 to 17 carbon atoms. Useful results have also been obtained when component (a) is succinic acid and component (b) is the sodium salt of a dicarboxylic ester of sulpho-succinic acid in which the group $R^2$ is a straight- or branched-chain alkyl group of 8 to 18 carbon atoms.

The molar proportions of (a) and (b) can be varied widely, for example from 30:1 to 1:10. However, we generally prefer to avoid a large excess of one component relative to the other component and hence we generally prefer that the molar proportions of (a) and (b) are from 25:1 to 1:3. If component (a) is a dicarboxylic acid or component (b) is a di-sulphur acid, the components may be used in essentially stoichiometric proportions, for example one mole of a dicarboxylic acid to two moles of a mono-sulphur acid or a salt thereof.

The composition of the present invention may optionally contain further components. In particular, the composition may also include an amine and the presence of the amine can give an improved result compared to that obtained using only the carboxylic acid and the organic sulphur-containing acid or salt thereof.

Thus, as a further aspect of the present invention there is provided a composition comprising (a) a carboxylic acid compound which contains at least three carbon atoms, (b) an organic sulphur-containing acid or a salt of said acid and (c) an amine.

Components (a) and (b) are as described in detail previously herein.

Component (c) is an amine as described in detail in our said European Patent Application Publication No. 0267695. More specifically, the amine which is component (c) may be a diamine or a substituted amine, for example an ethoxylated amine. Thus component (c) may be a compound of general formula III or IV:

$$R^3N-(CH_2)_m-NR^3 \qquad \qquad III$$
$$\phantom{R^3N}|\phantom{-(CH_2)_m-}| $$
$$\phantom{R^3N}R^4\phantom{-(CH_2)_m-}R^4$$

$$R^3R^4R^5N \qquad \qquad IV$$

wherein:
$R^3$ is a hydrocarbyl group or a substituted hydrocarbyl group and is preferably a hydrocarbyl group containing at least four carbon atoms;
$R^4$ is a hydrocarbyl group, a substituted hydrocarbyl group or a group $(R^6O)_x(C_2H_4O)_yH$;
$R^5$ is a hydrocarbyl group, a substituted hydrocarbyl group or a group $(R^6O)_x(C_2H_4O)_yH$, and may be the same as, or different from, $R^4$;
$R^6$ is an alkylene group containing 3 to 5 carbon atoms;
m is an integer and has a value of 1 to 10;
y is zero or is an integer which has a value of from 1 to 50; and
x is zero or is an integer which has a value of from 1 to 50.

Useful mixtures have been obtained in which the amine is a compound of formual IV wherein at least one of the groups $R^4$ and $R^5$ is a group $(R^6O)_x(C_2H_4O)_yH$ in which the value of x and/or y is from 1 to 50. A mixture of compounds may be used as component (c), for example a mixture of compounds in which the value of at least one of m, x and y differs. The mixture may be of compounds in which the nature of $R^3$ varies, for example when $R^3$ is a mixture of alkyl groups. If a mixture of compounds is used, such a mixture may be one of compounds of formula IV in which there is present at least one group $(R^6O)_x(C_2H_4O)_yH$ in which group the value of x and/or y varies, and particularly at least one group in which x is zero and the value of y varies.

The group $R^3$ is preferably an alkyl group and particularly is an alkyl group containing at least 8 carbon atoms. Typically $R^3$ does not contain more than 20 carbon atoms.

In the compound of formula III, $R^4$ is preferably either a hydrogen atom [when the values of x and y are zero in the group $(R^6O)_x(C_2H_4O)_yH$], or is a methyl group or hydroxyethyl group. The value of m is preferably from 2 to 6.

In the compound of formula IV, the groups $R^4$ and $R^5$ are each, independently, either a group $R^3$ or a group $(R^6O)_x(C_2H_4O)_yH$ in which the value of x is zero and y is 0 to 50. Preferably the groups $R^4$ and $R^5$ are both the same as the group $R^3$ or at least one of $R^4$ and $R^5$ is a group $(R^6O)_x(C_2H_4O)_yH$ in which the value of y is 1 to 50. Preferred amines are those in which at least one of the groups $R^3$, $R^4$ and $R^5$ is an alkyl group containing at least 8 carbon atoms, especially at least 12 carbon atoms. The group $R^6$ is preferably a propylene group. Both x and y can be zero or at least one of x and y has a positive value. The value of x and y preferably does not exceed 20 and especially does not exceed 15. The group $(R^6O)_x(C_2H_4O)_yH$ may be an OH ended alkylene oxide, for example a propylene oxide group, an OH ended ethylene oxide group or may contain both alkylene oxide and ethylene oxide groups. If x and y both have a positive value, it is generally preferred that (x+y) has a value of 2 to 50, and preferably does not exceed 20 and especially does not exceed 15.

If the amine contains a substituted group, the substituent may be a hydroxy group, one or more halogen atoms, a nitrile group, a hydrocarbyloxy group, a hydrocarbonyl group such as an acyl group, a hydrocarbyloxycarbonyl or a hydrocarbonyloxy group, whereof the hydrocarbyl groups may be further substituted with substituent groups of the foregoing types.

Amines which may be used as an optional component in the compositions of the present invention include
N,N-bis(hydroxyethyl)alkyl($C_{13}$ to $C_{15}$)amine;
N-methyl-N-hydroxyethyl-alkyl($C_{13}$ to $C_{15}$)amine;
N,N-dimethyl-octadecylamine;
N,N-bis(hydroxyethyl)-octadecylamine;
N-methyl-N,N-bis(coco)amine;
N,N-dimethyl-tallowamine; and
N-tallow-N,N',N'-tris(hydroxyethyl)-1,3-diaminopropane.

If the composition includes an amine, the proportion by weight of the amine may be from 0.1 up to 10 times the proportion by weight of the organic sulphur-containing acid or salt thereof which is component (b). The amine is typically present in a weight proportion of not more than twice the proportion by weight of the organic sulphur-containing acid or salt thereof.

The compositions of the present invention may be incorporated into an olefin polymer and it may be convenient to premix the compositions of the present invention with at least some of the additives which may be added to olefin polymers.

As yet a further aspect of the present invention there is provided a polymer composition which comprises an olefin polymer, a carboxylic acid compound which contains at least three carbon atoms, an organic sulphur-containing acid or a salt of said acid and optionally an amine.

The carboxylic acid compound, the organic sulphur-containing acid or salt thereof and the optional amine are components (a), (b) and optional component (c) of the composition discussed hereinbefore.

In the polymer composition the proportion of the carboxylic acid compound is typically from 0.01 up to 3%, and preferably from 0.02 up to 1%, by weight relative to the polymer. The proportion of the organic sulphur-containing acid or salt thereof, is typically from 0.02 up to 3%, preferably from 0.05 up to 1%, and especially about 0.1 to 0.2% by weight relative to the polymer. The optional amine can be present in a proportion of 0.01 up to 5%, preferably 0.02 up to 1%, and especially 0.02 to 0.15%, by weight relative to the polymer.

The olefin polymer (which term is used herein to include both homopolymers and copolymers) may be any ethylene homopolymer or copolymer, particularly high density polyethylene or linear low density polyethylene which is a copolymer of ethylene with a higher olefin monomer such as butene-1, hexene-1, octene-1 or 4-methylpentene-1. Other ethylene polymers are the copolymers of ethylene and a polymer monomer, for example an ethylene-vinyl acetate copolymer. Alternatively, the olefin polymer may be a propylene homopolymer or copolymer, for example a random copolymer of propylene with up to 8% by weight, relative to the polymer, of ethylene, or a sequential polymer obtained by polymerising propylene in the essential absence of other monomers and thereafter copolymerising a mixture of ethylene and propylene to give a polymer containing from 5 up to 30% by weight of ethylene.

The polymer composition may be obtained by adding the carboxylic acid, and the organic sulphur-containing acid or salt thereof, and also the optional amine, separately to the olefin polymer or the additives may be pre-mixed and then added to the olefin polymer. The carboxylic acid, the sulphur-containing acid or salt, and the amine if present, when incorporated into an olefin polymer, result in an increase in the crystallisation temperature and/or an improvement in optical properties of the polymer. If an amine is used, this can react with the carboxylic acid or the sulphur-containing acid and we believe that the product of such reaction could be less effective in giving the desired effects when incorporated into an olefin polymer. Accordingly, we prefer to avoid maintaining compositions which include the optional amine at an elevated temperature, for example above 120° C. and especially above 200° C., for a prolonged period of time, for example in excess of 15 minutes.

Some components of the compositions of the first aspect of the present invention are either liquids or waxy solids at ambient temperature and are difficult to handle in this form, especially if accurate metering of the components is required. Hence, it may be preferred that the compositions are obtained as a polymer masterbatch containing a higher concentration of the composition than is required in the final polymer composition. The polymer masterbatch may be a mixture obtained by blending, without melting, with a particulate polymer. However, it is generally preferred that the masterbatch has been obtained by blending with molten polymer. In this case, if the masterbatch contains an amine, together with component (a) and component (b), when this is a sulphur-containing acid rather than a salt, reaction of the amine with the acids may occur if mixing is effected at a sufficiently high temperature. It is desirable to minimise the possibility of reaction between components (a) and (b) and optional component (c). One technique of minimising the possibility of reaction of amine and acid is to form at least two masterbatches, one of which contains the amine in the absence of any acid and the other of which contains acid in the absence of any amine. If component (b) is a salt, this may be included in a masterbatch with either the carboxylic acid which is component (a), or with the amine which is optional component (c), or may be in a masterbatch separate from either component (a) or component (c). However, we have found that a satisfactory masterbatch can be obtained which contains components (a), (b) and (c) if components (a), (b) and (c) are mixed with a molten polymer at a temperature in the range 120° to 150° C. Suitable polymers for use in obtaining such a masterbatch are low density polyethylene, polyethylene wax or ethylene/vinyl acetate copolymer. The mixing may be effected using an apparatus which is suitable for processing a molten polymer, for example an extruder.

The amount of additive in the masterbatch is dependent on the nature of the particular additive. Typically the masterbatch contains at least 5% by weight of additive but in general the level of additive does not exceed 90% by weight. The level of additive in the masterbatch is generally at least 10% by weight. It is very convenient to form masterbatches containing high proportions of additive and we have been able to form masterbatches containing 70% by weight of additives and satisfactory masterbatches containing 50% up to 70% by weight of additives are readily formed. If components (a), (b) and optional component (c) have been formed into two or more separate masterbatches, these may be pre-mixed in any desired proportion and without being subjected to an elevated temperature and the mixture may be added to a polymer. Alternatively, the separate masterbatches may be added separately to the polymer, without being premixed. In compositions containing the optional amine, we have found that with some amines, the use of a masterbatch not only results in easier handling of the material but can also lead to improved colour in the final polymer composition.

If a polymer masterbatch is formed, it will be appreciated that it is desirable that the polymer used to form the masterbatch should be compatible with the polymer used for the polymer composition. Thus, the polymer used for the masterbatch is typically of the same general type as the polymer used for the polymer composition, for example both polymers are low density polyethylene or are both propylene homopolymers, but a masterbatch containing low density polyethylene may be incorporated satisfactorily into a propylene polymer. In general the amount of masterbatch to be used is a minor proportion of the final polymer composition and compatibility may be more readily achieved using such relative proportions of the polymers. By way of example, a masterbatch is used in an amount of 1 to 10% by weight of the final composition when the masterbatch contains 10% by weight of the carboxylic acid, sulphur-containing acid or salt, and/or optional amine. More specifically there is used 3 to 5% by weight of an acid masterbatch containing 10% by weight of the carboxylic acid and between 2% and 15% by weight of the sulphur-containing acid or a salt thereof. If an amine is to be included in the polymer as optional component (c), there is also used 0.2 to 5% by weight of an amine masterbatch containing 10% by weight of the optional amine. Masterbatches containing other proportions of additive are added in the appropriate amounts in dependence on the level of additive in the masterbatch and the level required in the final polymer composition.

The amine which is optional component (c), is generally a liquid or waxy solid and hence the use of a masterbatch is desirable when an amine is present. However, using only components (a) and (b), these materials may be mixed in the molten state, for example at a temperature of from 150° to 200° C., and the molten material cooled to form pellets or a solid block from which flakes may be obtained. Hence, a masterbatch is not generally necessary using components (a) and (b) in the absence of optional component (c).

The polymer compositions of the present invention possess an increased crystallisation temperature and/or improved optical properties compared to the original polymer. The presence of the optional amine can produce further improvements in optical properties and/or crystallisation temperature.

The polymer composition of the present invention may also include other additives which are conventionally added to olefin polymers. Thus, the polymer composition may include other nucleating agents. The polymer may also include inorganic additives such as silica, especially finely divided silica, which may be present in proportions of less than 1% by weight relative to the polymer. By finely divided silica is meant silica having an average particle size of not more than 5 micrometres and especially not more than one micrometre.

The polymer composition also typically includes additives to at least partially inhibit the degradation of the olefin polymer component of the composition. These additives include, inter alia, antioxidants, light stabilisers, antacids, lubricants, anti-static agents, optical brighteners and, as necessary, copper or other metal deactivators. The proportion of each of such additives is typically less than 2% by weight based on the olefin polymer and in general does not exceed 1% by weight based on the olefin polymer. A wide range of additives which provide some inhibition of the degradation of olefin polymers are known and the skilled worker will be able to select appropriate additives in accordance with the particular olefin polymer and the conditions under which it is to be processed and used. Examples of additives which can be used include, inter alia, 1,1,3-tris(2-methyl-4-hydroxy-5-tertiarybutylphenyl)-butane;
polymerised 1,2-dihydro-2,2,4-trimethylquinoline;
2,6-di-tertiarybutyl-4-methylphenol;
4,4-thio-bis-(6-tertiarybutyl-4-methylphenol);
oxalic acid bis (benzylidene hydrazide);
N,N'-bis(beta-3,5-ditertiarybutyl-4-hydroxyphenylpropiono)hydrazide;
pentaerythritol-tetra-[3-(3,5-di-tertiary-butyl-4-hydroxyphenyl)propionate];
beta-(3,5-di-tertiary-butyl-4-hydroxyphenyl)-propionic acid-n-octadecyl ester;
2,2-bis[4-(2-(3(3,5-di-tertiary-butyl-4-hydroxyphenyl)-propionyl)oxy)ethoxy)phenyl]propane;
2-(2'-hydroxyphenyl)-benzotriazole derivatives;
2-hydroxybenzophenones such as 4-octoxy-2-hydroxybenzophenone;
sterically hindered amines such as 4-benzoyl-2,2,6,6-tetramethylpiperidine;
tris(2,4-di-tertiary-butylphenyl)phosphite;
an ester of thiodipropionic acid such as dilaurylthiodipropionate;
calcium stearate;
zinc stearate;
dehydrotalcite;
glycerol mono-octadecanoate; and
2,5-bis(5-tert.butylbenzoxazol-2-yl)thiophene.

As is well known, if an ester of thiodipropionic acid is used, this is generally used together with a phenolic antioxidant such as 1,1,3-tris(2-methyl-4-hydroxy-tertiarybutyl)butane.

These further polymer additives may be incorporated into the polymer using any of the known techniques and some or all of these polymer additives may be pre-mixed with one or more of the components of the composition of the present invention. Alternatively, the further additives may be incorporated into the polymer in a separate stage before or after, preferably before, adding the composition of the present invention.

The polymeric compositions in accordance with the present invention may be formed into film and other shaped articles by any suitable technique, particularly by extrusion or, especially, by injection moulding. We have found that the effectiveness of the composition of a carboxylic acid, a sulphur-containing acid or salt thereof and the optional amine, can be dependent to some extent on the technique used to obtain the shaped article. Particularly useful effects have been noted when the shaped article has been obtained by injection moulding.

The composition of the present invention, and the polymer composition, may be obtained by blending the components of the composition together using any known, suitable technique as discussed previously herein. The polymer, carboxylic acid, sulphur-containing acid or salt therof and amine, if an amine is being used, may be mixed under conditions in which the polymer is molten, the mixture granulated and the granulated polymer used in a subsequent melt processing stage to give a shaped article, particularly by injection moulding. However, in order to minimise the time during which any acid and the optional amine are mixed at elevated temperature, it is preferred that the acid and amine, if used, are added separately, or as a mixture obtained by a solids blending technique, to the polymer at the final stage of producing a shaped polymer article, for example at the injection moulding stage.

The production of compositions and polymer compositions in accordance with the present invention are described in the following illustrative examples, in which some properties of the compositions produced are also given. Unless otherwise stated, percentages in the polymer composition are by weight relative to the polymer component.

EXAMPLES 1 TO 5

Masterbatch compositions were prepared using either succinic acid or a sodium alkyl sulphonate.

The masterbatches were prepared using a random copolymer of propylene and ethylene, containing about 2.6% by weight of ethylene and having a melt flow index of about 7 (measured at 230° C. with a weight of 2.16 kg using the procedure of ASTM Test Method D 1238) and available as 'Propathene' (Registered Trade Mark) grade PXC 22406 from Imperial Chemical Industries PLC. Each of the masterbatches contained 10% by weight of additive (succinic acid or sodium alkyl sulphonate). The masterbatches were prepared on a Polymix 150 type two roll mill (available from Schwabenthan) with the front roll at 190° C. and the rear roll at 150° C. The molten polymer was granulated using a Pallmann type PS/2 granulator.

Portions of the masterbatches thus obtained were added to a further quantity of the same random propylene copolymer in amounts to give the desired final level of additives as set out in Table One. The masterbatches were tumble blended with the polymer. The mixture thus obtained was extruded using a Betol extruder having a 25 mm diameter screw with a cavity transfer mixer. The temperature profile in the extruder was 190° C. up to 220° C., dropping to 205° C. at the die. The extruded lace was passed through a water bath, dried and then granulated.

The products obtained were then formed into discs of 8.9 cm diameter and 1.6 mm thickness by injection moulding the granules using a Boy 30M injection moulding machine operating at 240° C. and with a mould temperature of 50° C. On ejection from the mould, the moulded discs were allowed to cool naturally.

Tests were carried out on the injection moulded discs to determine relative clarity, haze, gloss and yellowness index.

The results obtained are set out in Table One, together with the results of comparative examples not in accordance with the present invention.

TABLE ONE

| Example or Comp. Ex. | Additives Type (a) | Weight (%)(b) | Relative Clarity (c) | Haze (%) (d) | Gloss (%) (e) | YI (f) |
|---|---|---|---|---|---|---|
| A | Nil | Nil | 20 | 82 | 78 | 8.6 |
| B | DBS | 0.25 | 85 | 47 | 109 | 10.9 |
| C | SA | 0.4 | 92 | 50 | ND | 9.4 |
| 1 | SA | 0.4 | 140 | 37 | 117 | 4.8 |
|   | SAS | 0.1 |  |  |  |  |
| 2 | SA | 0.4 | 140 | 35 | 123 | 5.4 |
|   | SAS | 0.2 |  |  |  |  |
| 3 | SA | 0.4 | 147 | 35 | 121 | 5.2 |
|   | SAS | 0.3 |  |  |  |  |
| 4 | SA | 0.4 | 147 | 35 | 121 | 5.1 |
|   | SAS | 0.4 |  |  |  |  |
| 5 | SA | 0.4 | 140 | 36 | 121 | 5.4 |
|   | SAS | 0.5 |  |  |  |  |

Notes to Table One
(a) DBS is dibenzylidene sorbitol.
SA is succinic acid.
SAS is sodium alkyl sulphonate in which the alkyl group is a mixture of alkyl groups containing 13 to 18 carbon atoms with about 95% by weight being alkyl groups containing 14 to 17 carbon atoms.
(b) % weight is weight of additive relative to the polymer.
(c) Relative clarity is a comparison of the clarity of an injection moulded disc of the polymer compared to a standard (the polymer with no additives, as in Comp. Ex. A). The apparatus consists of a light cabinet with a grid marked on the surface. 82.5 mm (3.25 inches) above the top of the light cabinet is a flat support having a slit cut in it through which the grid is visible. The stand is surrounded by an enclosure with darkened interior surfaces.
Two reference discs are stacked together and placed over the slit to almost totally obscure the image of the grid as viewed through this pile of two discs. The test specimens (injection moulded discs obtained as described in Examples 1 to 12) are stacked over the slit, adjacent to the reference discs, further discs being added to the stack until the image of the grid viewed through the test specimens is almost totally obscured and corresponds essentially with the image seen through the reference discs. If exact correspondence is not achieved, an estimate of part discs is made. The relative clarity is expressed as the number of discs in the stack multiplied by 10, that is a relative clarity of 100 corresponds to a stack of 10 discs.
(d) % haze is determined in accordance with ASTM Test Method D 1003-59T using a Gardner Hazemeter and is measured on an injection moulded disc.
(e) % gloss is as determined on an injection moulded disc using an Elcometer 20° glossmeter in accordance with ASTM Test Method D523-80.
(f) YI is yellowness index as determined on an injection moulded disc using the procedure of ASTM E313-73 with CIE tristimulus values measured on a color meter.
ND indicates that this property was not determined.

EXAMPLES 6 TO 12

The procedure of Examples 1 to 5 was repeated with the additional use of a masterbatch containing an amine. Calcium octadecanoate was also added, as a masterbatch, in some of the examples.

The results obtained are set out in Table Two, together with the results of a comparative example not in accordance with the present invention.

TABLE TWO

| Example or Comp. Ex. | Additives Type (a)(h) | Weight (%)(b) | Relative Clarity (c) | Haze (%) (d) | Gloss (%) (e) | YI (f) |
|---|---|---|---|---|---|---|
| 6 | SA | 0.4 | 130 | 40 | 116 | 5.5 |
|   | SAS | 0.1 |  |  |  |  |
|   | EA | 0.03 |  |  |  |  |
| 7 | SA | 0.4 | 137 | 38 | 118 | 5.9 |
|   | SAS | 0.1 |  |  |  |  |
|   | EA | 0.06 |  |  |  |  |
| 8 | SA | 0.4 | 137 | 38 | 118 | 6.2 |
|   | SAS | 0.1 |  |  |  |  |
|   | EA | 0.09 |  |  |  |  |
| 9 | SA | 0.4 | 145 | 36 | 120 | 6.7 |
|   | SAS | 0.1 |  |  |  |  |
|   | EA | 0.12 |  |  |  |  |
| 10 | SA | 0.4 | 155 | 34 | 117 | 7.3 |

TABLE TWO-continued

| Example or Comp. Ex. | Additives Type (a)(h) | Weight (%)(b) | Relative Clarity (c) | Haze (%) (d) | Gloss (%) (e) | YI (f) |
|---|---|---|---|---|---|---|
|  | SAS | 0.1 |  |  |  |  |
|  | EA | 0.15 |  |  |  |  |
| D | SA | 0.4 | 120 | 42 | 121 | 9.1 |
|  | EA | 0.15 |  |  |  |  |
| 11 | SA | 0.4 | 162 | 32 | 122 | 6.8 |
|  | SAS | 0.1 |  |  |  |  |
|  | EA | 0.15 |  |  |  |  |
|  | CS | 0.1 |  |  |  |  |
| 12 | SA | 0.4 | 112 | 38 | ND | 8.0 |
|  | SAS | 0.1 |  |  |  |  |
|  | EA* | 0.15 |  |  |  |  |
|  | CS | 0.1 |  |  |  |  |

Notes to Table Two
(a) to (f) are as defined in Notes to Table One.
(h) EA is an ethoxylated amine of the type RN[(C$_2$H$_4$O)$_y$H]$_2$ where y has an average value of one and R is a mixture of linear and branched aliphatic groups containing from 13 to 15 carbon atoms.
CS is calcium octadecanoate.
*The EA was added as a masterbatch containing a high surface area silica thereby giving 0.06% by weight of silica relative to the polymer.

EXAMPLE 13

The procedure described for Examples 1 to 5 was repeated with the exception that a different polymer was used. The polymer was a random copolymer of propylene and ethylene containing about 3.5% by weight of ethylene and having a melt flow index (as defined in Examples 1 to 12) of about 2 and available as 'Propathene' (Registered Trade Mark) grade PXC 22265 from Imperial Chemical Industries PLC.

The results obtained are set out in Table Three, together with results of comparative examples not in accordance with the present invention.

TABLE THREE

| Example or Comp. Ex. | Additives Type (a) | Weight (%)(b) | Relative Clarity (c) | Haze (%) (d) | Gloss (%) (e) | YI (f) | T$_c$ (°C.) (i) |
|---|---|---|---|---|---|---|---|
| E | Nil | Nil | 35 | 70 | 83 | 10.8 | 111 |
| F | SA | 0.35 | 130 | 36 | 108 | 7.9 | 121 |
| 13 | SA | 0.35 | 195 | 24 | 119 | 7.4 | 123 |
|  | SAS | 0.15 |  |  |  |  |  |
| G | SAS | 0.15 | 35 | 70 | 86 | 8.7 | 107 |
| H | DBS | 0.25 | 137 | 32 | 113 | 12.3 | 119 |

Notes to Table Three
(a) to (f) are as defined in Notes to Table One.
(i) T$_c$ is the crystallisation temperature as determined by differential scanning calorimetry and is the temperature of the highest rate of crystallisation on cooling from the melt at 20° C./minute.

EXAMPLES 14 TO 23

The procedure of Examples 1 to 5 was repeated with the exception that sodium alkyl sulphonate was replaced by diesters of sulpho-succinic acid at various levels and that the sulpho-succinic acid derivatives were added directly to the polymer in the desired proportions without the pre-formation of a masterbatch.

The results obtained are set out in Table Four, together with results of comparative examples not in accordance with the present invention.

TABLE FOUR

| Example or Comp. Ex. | Additives Type (a)(j) | Weight (%)(b) | Relative Clarity (c) | Haze (%) (d) | YI (f) |
|---|---|---|---|---|---|
| I | Nil | Nil | 20 | 80 | 6.1 |
| J | SA | 0.4 | 95 | 54 | 7.6 |
| 14 | SA | 0.4 | 140 | 40 | 5.3 |
|  | NOSS | 0.1 |  |  |  |
| 15 | SA | 0.4 | 140 | 40 | 3.8 |
|  | NOSS | 0.2 |  |  |  |
| 16 | SA | 0.4 | 142 | 39 | 3.7 |
|  | NOSS | 0.3 |  |  |  |
| 17 | SA | 0.4 | 140 | 39 | 3.6 |
|  | NOSS | 0.4 |  |  |  |
| 18 | SA | 0.4 | 140 | 39.5 | 3.1 |
|  | NOSS | 0.5 |  |  |  |
| 19 | SA | 0.4 | 135 | 41.5 | 5.8 |
|  | NEHSS | 0.1 |  |  |  |
| 20 | SA | 0.4 | 125 | 43 | 4.6 |
|  | NEHSS | 0.2 |  |  |  |
| 21 | SA | 0.4 | 137 | 39 | 6.1 |
|  | NEHSS | 0.3 |  |  |  |
| 22 | SA | 0.4 | 140 | 38 | 4.6 |
|  | NEHSS | 0.4 |  |  |  |
| 23 | SA | 0.4 | 135 | 39 | 6.4 |
|  | NEHSS | 0.5 |  |  |  |

Notes to Table Four
(a) to (d) and (f) are as defined in Notes to Table One.
(j) NOSS is the sodium salt of the di(n-octyl)carboxylic ester of sulpho-succinic acid.
NEHSS is the sodium salt of the di(2-ethylhexyl)carboxylic ester of sulpho-succinic acid.

EXAMPLES 24 TO 38

The procedure of Examples 1 to 5 was repeated using various carboxylic acids and also varying the sulphur-containing acid. With the exception of glycerol monooctadecanoate, all the additives were pre-formed into a masterbatch.

The results obtained are set out in Table Five, together with results of comparative examples not in accordance with the present invention.

TABLE FIVE

| Example or Comp. Ex. | Additives Type (a)(h)(j)(k) | Weight (%)(b) | Relative Clarity (c) | Haze (%) (d) | YI (f) |
|---|---|---|---|---|---|
| K | Nil | Nil | 20 | 76 | ND |
| L | DBS | 0.25 | 90 | 48.5 | ND |
| M | BA | 0.4 | 67 | 66 | ND |
| 24 | BA | 0.4 | 82 | 58 | ND |
|  | SAS | 0.1 |  |  |  |
| N | AA | 0.4 | 75 | 61 | ND |
| 25 | AA | 0.4 | 120 | 46 | ND |
|  | SAS | 0.1 |  |  |  |
| O | GA | 0.4 | 85 | 56 | ND |
| 26 | GA | 0.4 | 122 | 43 | ND |
|  | SAS | 0.1 |  |  |  |
| 27 | SA | 0.4 | 130 | 41.5 | 7.5 |
|  | NOSS | 0.2 |  |  |  |
|  | GMS | 0.05 |  |  |  |
| 28 | SA | 0.4 | 132 | 42 | 7.2 |
|  | NOSS | 0.2 |  |  |  |
|  | GMS | 0.1 |  |  |  |
| 29 | SA | 0.4 | 137 | 40.5 | 7.5 |
|  | NOSS | 0.2 |  |  |  |
|  | GMS | 0.15 |  |  |  |
| 30 | SA | 0.4 | 135 | 40.5 | 6.7 |
|  | NOSS | 0.2 |  |  |  |
|  | GMS | 0.2 |  |  |  |
| 31 | SA | 0.4 | 140 | 40 | 7.1 |
|  | NOSS | 0.2 |  |  |  |
|  | GMS | 0.25 |  |  |  |
| 32 | SA | 0.4 | 130 | 41.5 | 6.0 |
|  | SAS | 0.1 |  |  |  |
|  | GMS | 0.05 |  |  |  |
| 33 | SA | 0.4 | 132 | 41.5 | 5.7 |
|  | SAS | 0.1 |  |  |  |
|  | GMS | 0.1 |  |  |  |
| 34 | SA | 0.4 | 137 | 46.5 | 6.1 |
|  | SAS | 0.1 |  |  |  |
|  | GMS | 0.15 |  |  |  |
| 35 | SA | 0.4 | 132 | 41 | 5.8 |

TABLE FIVE-continued

| Example or Comp. Ex. | Additives Type (a)(h)(j)(k) | Weight (%)(b) | Relative Clarity (c) | Haze (%) (d) | YI (f) |
|---|---|---|---|---|---|
| | SAS | 0.1 | | | |
| | GMS | 0.2 | | | |
| 36 | SA | 0.4 | 140 | 39.5 | 6.7 |
| | SAS | 0.1 | | | |
| | GMS | 0.25 | | | |
| 37 | SA | 0.4 | 140 | 37.5 | 7.3 |
| | SAS | 0.1 | | | |
| | EA | 0.06 | | | |
| 38 | SA | 0.4 | 145 | 37.5 | 4.2 |
| | SAS | 0.1 | | | |
| | EA | 0.06 | | | |
| | UOB* | 20 ppm | | | |

Notes to Table Five
(a) to (d) and (f) are as defined in Notes to Table One.
(h) is as defined in Notes to Table Two.
(j) is as defined in Notes to Table Four.
(k) BA is benzoic acid
AA is adipic acid
GA is glutaric acid
GMS is glycerol mono-octadecanoate
UOB is 2,5-bis(5-tert.butylbenzoxazol-2-yl)thiophene
*This material was incorporated into the polymer as a 2% by weight masterbatch to give a final level in the polymer of 20 ppm by weight.

EXAMPLES 39 TO 51

The procedure of Examples 1 to 5 was repeated with the exception that the sodium alkyl sulphonate was replaced by other sulphonic acid salts and these other sulphonic acid salts were added directly to the polymer in the desired proportions without the pre-formation of a masterbatch.

The results obtained are set out in Table Six, together with the results of comparative examples not in accordance with the present invention.

TABLE SIX

| Example or Comp. Ex. | Additives Type (a)(h)(l) | Weight (%)(b) | Relative Clarity (c) |
|---|---|---|---|
| P | NIL | NIL | 22 |
| Q | SDS | 0.1 | 25 |
| 39 | SA | 0.4 | 95 |
| | SDS | 0.1 | |
| 40 | SA | 0.4 | 115 |
| | SDS | 0.1 | |
| | EA | 0.06 | |
| R | SDBS | 0.1 | 15 |
| 41 | SA | 0.4 | 107 |
| | SDBS | 0.1 | |
| 42 | SA | 0.4 | 115 |
| | SDBS | 0.1 | |
| | EA | 0.06 | |
| S | SBS | 0.1 | 22 |
| 43 | SA | 0.4 | 90 |
| | SBS | 0.1 | |
| 44 | SA | 0.4 | 97 |
| | SBS | 0.1 | |
| | EA | 0.06 | |
| 45 | SA | 0.4 | 110 |
| | SOS | 0.1 | |
| | EA | 0.06 | |
| T | STS | 0.1 | 15 |
| 46 | SA | 0.4 | 110 |
| | STS | 0.1 | |
| 47 | SA | 0.4 | 122 |
| | STS | 0.1 | |
| | EA | 0.06 | |
| U | SHS | 0.1 | 15 |
| 48 | SA | 0.4 | 112 |
| | SHS | 0.1 | |
| 49 | SA | 0.4 | 135 |
| | SHS | 0.1 | |
| | EA | 0.06 | |
| V | SODS | 0.1 | 20 |
| 50 | SA | 0.4 | 107 |
| | SODS | 0.1 | |
| 51 | SA | 0.4 | 127 |
| | SODS | 0.1 | |
| | EA | 0.06 | |

Notes to Table Six
(a) to (c) are as defined in Notes to Table One.
(h) is as defined in Notes to Table Two.
(l) SDS is sodium dodecyl sulphonate
SDBS is sodium 4-dodecylbenzene sulphonate
SBS is sodium benzene sulphonate
SOS is sodium octyl sulphonate
STS is sodium tetradecyl sulphonate
SHS is sodium hexadecyl sulphonate
SODS is sodium octadecyl sulphonate

EXAMPLES 52 AND 53

Masterbatch compositions based on a linear low density polyethylene were prepared by blending the components together on a two roll mill, the front roll being at 180° C. and the back roll being at 140° C. The polymer was added first and worked until melting occurred. The additives were then added to the mill and working was continued until the additives were completely homogenised (this required 10 to 15 minutes from the initial addition of the polymer) and there was no evidence of particle agglomeration, as indicated by white specks in the crepe. The milled composition was granulated using a Pallman granulator.

The linear low density polyethylene (LLDPE) used to prepare the masterbatch compositions was a product of density 926 kg/m$^3$ available from Exxon as Escorene LL 1201 XG. This polymer, as supplied, was used to obtain a blown film in a two stage process.

In the first stage, the LLDPE, with no additives, was melted on a two roll mill, the front roll being at 180° C. and the back roll being at 140° C. The molten polymer thus obtained was then granulated.

In the second stage the polymer granules, together with any separate additives or masterbatch, were used to obtain a blown film by means of a Brabender Plasticorder PLV 340 having a 1.9 cm diameter screw having a length:diameter ratio of 24:1. The screw was operated at 95 r.p.m. and the temperature profile in the extruder to the die was 220° C., 230° C., 240° C. and 250° C. (at the die). The polymer was extruded through an annular die gap of diameter 25 mm and width of 0.5 mm. The extruded tube was blown, by air pressure, to a blown film of diameter about 15 cm and having film thickness of 20 to 25 micrometers.

The properties of the films obtained are set out in Table Seven, together with the results of comparative examples not in accordance with the present invention.

TABLE SEVEN

| Example or Comp. Ex. (m) | Additives Type (a)(h)(n) | Weight (%)(b) | Haze (%) (o) | YI (p) | Gloss (%) (q) |
|---|---|---|---|---|---|
| W* | NIL | NIL | 7.0 | ND | ND |
| X** | NIL | NIL | 7.3 | 0.5 | 51 |
| Y | DBS | 0.25 | 7.7 | ND | ND |
| Z | SDP | 0.25 | 9.1 | ND | ND |
| AA | MDBS | 0.25 | 8.3 | ND | ND |
| 52+ | SA | 0.05 | 6.5 | 0.5 | 62 |
| | SAS | 0.1 | | | |
| 53++ | SA | 0.18 | 7.4 | ND | ND |

TABLE SEVEN-continued

| Example or Comp. Ex. (m) | Additives Type (a)(h)(n) | Weight (%)(b) | Haze (%) (o) | YI (p) | Gloss (%) (q) |
|---|---|---|---|---|---|
| | SAS | 0.045 | | | |
| | EA | 0.027 | | | |

Notes to Table Seven
(a) and (b) are both as defined in Notes in Table One.
(h) is as defined in Notes to Table Two.
(m) *The first stage of granulation was omitted, the polymer as supplied was formed directly into film with no additives.
**The polymer as supplied was granulated and was then formed into film with no additives.
+The additives were added as a masterbatch of composition by weight 20% SA, 40% SAS and 40% of the linear low density polyethylene. the masterbatch being added at a level of 0.25% by weight based on the LLDPE as supplied to the Plasticorder.
++The additives were added as a masterbatch of composition by weight 35.7% SA, 8.9% SAS, 5.4% EA and 50% of the linear low density polyethylene, the masterbatch being added at a level of 0.5% by weight based on the LLDPE as supplied to the Plasticorder.
(n) SDP is sodium di(4-tertiarybutylphenyl)phosphate.
MDBS is methyl dibenzylidene sorbitol.
(o) Percentage haze is as determined on a sample of film in accordance with ASTM Test Method D 1003-59T using a Colorimeter D25 PC2 available from Hunterlab of Virginia, USA.
(p) YI is yellowness index determined on a sample of film in accordance with ASTM Test method D 1925 using a Colorimeter D25 PC2.
(q) Percentage gloss was determined on a sample of film in accordance with British Standards 'Methods of Testing Plastics'. BS 2782, Method 515B using an "EEL" Plaspec Glosshead.

EXAMPLES 54 TO 56

The procedure described in Examples 52 and 53 was repeated with the exception that in some experiments different mixtures of additives were used and in all of the experiments the additives were added directly at the film forming stage and were not pre-formed into masterbatches.

The properties of the films obtained are set out in Table Eight, together with the results of a comparative example not in accordance with the present invention.

TABLE EIGHT

| Example or Comp. Ex. (m) | Additives Type (a)(h)(k) | Weight (%)(b) | Haze (%) (o) | Gloss (%) (q) |
|---|---|---|---|---|
| AB* | NIL | NIL | 8.9 | 50 |
| 54 | SA | 0.05 | 7.3 | 67 |
| | SAS | 0.1 | | |
| 55 | SA | 0.05 | 8.3 | 65 |
| | SAS | 0.1 | | |
| | EA | 0.05 | | |
| 56 | SA | 0.05 | 8.9 | 49 |
| | SAS | 0.1 | | |
| | GMS | 0.05 | | |

Notes to Table Eight
(a) and (b) are both as defined in Notes to Table One.
(h) is as defined in Notes to Table Two.
(k) is as defined in Notes to Table Five.
(m), (o) and (q) are all as defined in Notes to Table Seven.
AB is a repeat of W at a different time.

I claim:

1. A polymer composition which comprises an olefin polymer,
    (a) a carboxylic acid compound which contains at least three carbon atoms; and
    (b) an organic sulphur-containing acid or a salt of said acid of the formula I:

$$RSO_nM \qquad I$$

wherein:
    R is an alkyl group or substituted alkyl group;
    M is a hydrogen atom or a cation; and
    n is 2, 3 or 4.

2. The polymer composition of claim 1 wherein (a) is a carboxylic acid compound which contains at least three carbon atoms and at least one carboxylic acid group.

3. The polymer composition of claim 1 wherein (a) is a carboxylic acid compound which contains at least three carbon atoms and contains at least two carboxylic acid groups attached to an optionally substituted aliphatic hydrocarbon group or contains at least one carboxylic acid group attached to an optionally substituted saturated or unsaturated ring system.

4. The polymer composition of claim 3 wherein (a) is a carboxylic acid compound which contains at least two carboxylic acid groups attached to an optionally substituted aliphatic hydrocarbon group or is one containing at least one carboxylic acid group attached to an optionally substituted saturated or unsaturated ring system where in the substituents are one or more of the groups selected from a hydroxy group, a halogen atom, an ester group, a sulphur-containing acid group or a salt of said acid, a nitrile group, an ether group or a different hydrocarbon group which may be further substituted with the same or different substituent groups.

5. The polymer composition of claim 3 wherein (a) is a carboxylic acid compound which either contains at least two carboxylic acid groups attached to a saturated aliphatic hydrocarbon group and is selected from glutaric acid, adipic acid, succinic acid, suberic acid, pimelic acid, azelaic acid and sebacic acid or which contains at least one carboxylic acid group attached to a ring system and is selected from benzoic acid, toluic acid, p-tertiary butyl benzoic acid, phthalic acid, terephthalic acid, cyclohexane-1,2-dicarboxylic acid, cyclohexane-1,4-di-carboxylic acid and salicylic acid and salicylic acid.

6. The polymer composition of claim 1 wherein in component (b) R is an alkyl group which contains at least 12 carbon atoms.

7. The polymer composition of claim 1 wherein (b) is an organic sulphur-containing acid or salt thereof of the general formula II:

$$R^1SO_3M^1 \qquad II$$

wherein:
R$^1$ is a alkyl group containing at least 6 carbon atoms or a alkyl group substituted with at least one COOR$^2$ group;
R$^2$ or each R$^2$ is hydrogen or a hydrocarbon group which may be the same or different, and R$^1$ and R$^2$ between them contain at least 6 carbon atoms; and
M$^1$ is an alkali metal.

8. The polymer composition of claim 1 wherein in component (b) the substituent of the group R is at least one halogen atom, a carboxylic acid group, an ester group, a sulphuric-containing acid group, a nitrile group, an ether group or a different hydrocarbon group.

9. The polymer composition of claim 1 wherein in component (b) the group R is an alkyl group which contains at least 12 carbon atoms or is a substituted alkyl group having two ester groups.

10. The polymer composition of claim 9 wherein in component (b) the group R is a mixture of different isomers, or of groups containing different numbers of carbon atoms, or both.

11. The polymer composition of claim 9 wherein component (b) is a dicarboxylic ester of sulpho-succinic acid.

12. The polymer composition of claim 7 wherein component (a) is succinic acid and component (b) is either a compound in which $M^1$ is sodium and $R^1$ is an alkyl group, or a mixture of alkyl groups, containing from 12 to 18 carbon atoms or a compound in which $M^1$ is sodium, and $R^1$ is a dicarboxylic ester of sulpho-succinic acid in which the group $R^2$ is a straight or branched-chain alkyl group of 8 to 18 carbon atoms.

13. The polymer composition of claim 1 wherein (a) and (b) are in molar proportions of from 25:1 to 1:3.

14. The polymer composition of claim 1 wherein the proportion of component (a) is from 0.01 to 3% by weight relative to the polymer.

15. The polymer composition of claim 1 wherein the proportion of component (b) is from 0.02 up to 3% by weight relative to the polymer.

16. The polymer composition of claim 1 which additionally contains (c) an amine which is a compound of the general formula III or IV:

$$R^3N-(CH_2)_m-NR^3 \atop {\overset{|}{R^4} \qquad \overset{|}{R^4}} \qquad \text{III}$$

$$R^3R^4R^5N \qquad \text{IV}$$

wherein:
$R^3$ is a hydrocarbyl group of a substituted hydrocarbyl group;
$R^4$ is a hydrocarbyl group, a substituted hydrocarbyl group or a group $(R^6O)_x(C_2H_4O)_yH$;
$R^5$ is a hydrocarbyl group, a substituted hydrocarbyl group or a group $(R^6O)_x(C_2H_4O)_yH$, and may be the same as, or different from, $R^4$;
$R^6$ is an alkylene group containing 3 to 5 carbon atoms;
m is an integer and has a value of 1 to 10;
y is zero or is an integer which has a value of from 1 to 50; and
x is zero or is an integer which has a value of from 1 to 50.

17. The polymer composition of claim 1 in which the olefin polymer is an ethylene homopolymer or copolymer or a propylene homopolymer or copolymer.

18. The polymer composition of claim 1 which also contains at least one further additive selected from nucleating agents, inorganic additives, antioxidants, light stabilizers, antacids, lubricants, anti-static agents, optical brighteners, copper or other metal deactivators.

19. A process for the production of a polymer composition which comprises blending an olefin polymer with a carboxylic acid compound which contains at least three carbon atoms and with an organic sulphur-containing acid or a salt of said acid of the formula I:

$$RSO_nM \qquad \text{I}$$

wherein:
R is an alkyl group or substituted alkyl group;
M is a hydrogen atom or a cation; and
n is 2, 3 or 4.

* * * * *